(12) United States Patent
Zhou et al.

(10) Patent No.: US 11,472,939 B2
(45) Date of Patent: Oct. 18, 2022

(54) THERMALLY CONDUCTIVE THREE-DIMENSIONAL (3-D) GRAPHENE POLYMER COMPOSITE MATERIALS, METHODS OF MAKING, AND USES THEREOF

(71) Applicant: SABIC Global Technologies B.V., Bergen op Zoom (NL)

(72) Inventors: Xufeng Zhou, Ningbo (CN); Jingbo Ma, Ningbo (CN); Shiyun Ding, Ningbo (CN); Yunyang Liu, Thuwal (SA); Ihab N. Odeh, Sugar Land, TX (US); Zhaoping Liu, Ningbo (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 244 days.

(21) Appl. No.: 16/468,321

(22) PCT Filed: Dec. 5, 2017

(86) PCT No.: PCT/IB2017/057669
§ 371 (c)(1),
(2) Date: Jun. 11, 2019

(87) PCT Pub. No.: WO2018/109618
PCT Pub. Date: Jun. 21, 2018

(65) Prior Publication Data
US 2020/0071487 A1    Mar. 5, 2020

(30) Foreign Application Priority Data
Dec. 15, 2016  (CN) ......................... 201611161159.7

(51) Int. Cl.
| | | |
|---|---|---|
| C08K 3/04 | (2006.01) | |
| C08K 7/24 | (2006.01) | |
| C08K 9/08 | (2006.01) | |
| C08L 3/02 | (2006.01) | |
| C08L 29/04 | (2006.01) | |
| C08L 39/06 | (2006.01) | |
| C08L 63/00 | (2006.01) | |
| C08L 67/00 | (2006.01) | |
| C09K 5/08 | (2006.01) | |

(52) U.S. Cl.
CPC ............... *C08K 3/042* (2017.05); *C08K 7/24* (2013.01); *C08K 9/08* (2013.01); *C09K 5/08* (2013.01); *C08K 2201/001* (2013.01); *C08L 3/02* (2013.01); *C08L 29/04* (2013.01); *C08L 39/06* (2013.01); *C08L 63/00* (2013.01); *C08L 67/00* (2013.01)

(58) Field of Classification Search
CPC ............ C08K 3/042; C08K 7/24; C08K 9/08
See application file for complete search history.

(56) References Cited

U.S. PATENT DOCUMENTS

| | | |
|---|---|---|
| 2014/0110049 A1 | 4/2014 | Yuen et al. |
| 2015/0132565 A1 | 5/2015 | McKay et al. |

FOREIGN PATENT DOCUMENTS

| | | |
|---|---|---|
| CN | 102732037 | 10/2012 |
| CN | 103057221 | 4/2013 |
| CN | 104151775 | 11/2014 |

OTHER PUBLICATIONS

Machine translation of CN 102732037 (Year: 2012).*
Balandin, "Thermal Properties of Graphene and Nanostructured Carbon Materials," *Nature Materials*, 10: 569-581, 2011.
Barzegar, et al., "Synthesis of 3D Porous Carbon Based on Cheap Polymers and Graphene Foam for High-Performance Electrochemical Capacitors," *Electrochimica Acta*, 180: 442-450, 2015.
Chen, et al., "Fabrication of Three-Dimensional Graphene Foam with High Electrical Conductivity and Large Adsorption Capability," *Applied Surface Science*, 311: 808-815, 2014.
Huang, et al., "Three-Dimensional Graphene Foam and Carbon Fibers Reinforced Epoxy Resin Composites with Enhanced Thermal Conductivity," *China Semiconductor Technology International Conference*, 2016.
International Search Report and Written Opinion Issued in Corresponding PCT Application No. PCT/IB2017/057669, dated Mar. 16, 2018.
Jia, et al., "Exceptional Electrical Conductivity and Fracture Resistance of 3D Interconnected Graphene Foam/Epoxy Composites," *ACS Nano*, 8(6): 5774-5783, 2014.
Li, et al., "Highly Electrically Conductive Nanocomposites Based on Polymer-Infused Graphene Sponges," *Scientific Reports*, 4(4652): 1-6, 2014.
Liu, et al. "Exceptionally High Thermal and Electrical Conductivity of Three-Dimensional Graphene-Foam Based Polymer Composites," *RSC Advances*, 6(27): 22364-22369, 2016.
Ma, et al., "Solvent Evaporation Induced Self-Assembly of Graphene Foam for Thermally Conductive Polymers," *RSC Advances*, 7: 15469-15474, 2017.
Pierson, "Handbook of Carbon, Graphite, Diamond and Fullerenes: Properties, Processing, and Applications," Park Ridge, New Jersey, Noyes Publications, 1993.
Prasher, "Thermal Interface Materials: Historical Perspective, Status, and Future Directions," *Proceedings of the IEEE*, 94: 1571-1586, 2006.

(Continued)

*Primary Examiner* — Wenwen Cai
(74) *Attorney, Agent, or Firm* — Cantor Colburn LLP

(57) ABSTRACT

A thermally conductive three-dimensional (3-D) graphene-polymer composite material, methods of making, and uses thereof are described. The thermally conductive three-dimensional (3-D) graphene-polymer composite material contains: (a) a porous 3-D graphene structure comprising a network of graphene layers that are attached to one another through a carbonized organic polymer bridging agent; and (b) a polymer material impregnated within the porous 3-D graphene structure, wherein the thermally conductive 3-D graphene-polymer composite material has a thermal conductivity of 10 W/m·K to 16 W/m·K.

18 Claims, 3 Drawing Sheets

(56) References Cited

OTHER PUBLICATIONS

Shahil & Balandin, "Graphene-Multilayer Graphene Nanocomposites as Highly Efficient Thermal Interface Materials," *Nano Letters*, 12(2): 861-867, 2012.

Shtein, et al., "Thermally Conductive Graphene-Polymer Composites: Size, Percolation, and Synergy Effects," *Chemistry of Materials*, 27: 2100-2106, 2015.

Tao, et al., "Monolithic Carbons with Spheroidal and Hierarchical Pores Produced by the Linkage of Functionalized Graphene Sheets," *Carbon*, 69: 169-177, 2014.

Xu, et al., "Enhancement of Thermal Interface Materials with Carbon Nanotube Arrays," *International Journal of Heat and Mass Transfer*, 49: 1658-1666, 2006.

Yi, et al., "Achieving Concentrated Graphene Dispersions in Water/Acetone Mixtures by the Strategy of Tailoring Hansen Solubility Parameters," *Journal of Physics D: Applied Physics*, 46(025301): 1-9, 2012.

Yim & Paik, "Recent Advances on Anisotropic Conductive Adhesives (ACAs) for Flat Panel Displays and Semiconductor Packaging Applications," *International Journal of Adhesion and Adhesives*, 26(5): 304-313, 2006.

Zhao, "Study on Thermal Properties of Graphene Foam/Graphene Sheets Filled Polymer," *Composites Part A*, 72: 200-206, 2015.

Search Report from the China National Intellectual Property Administration (CNIPA) issued in corresponding Chinese Patent Application for invention No. 201611161159.7, dated May 8, 2021.

\* cited by examiner

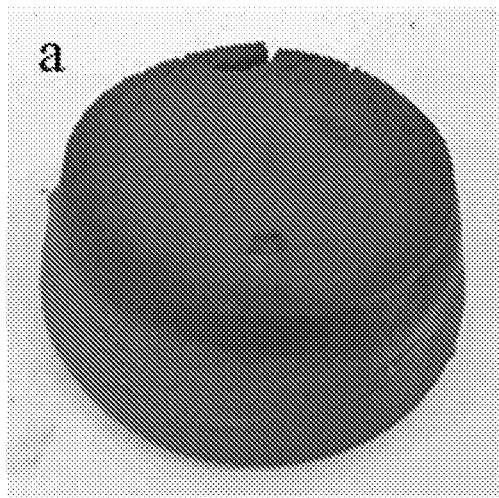
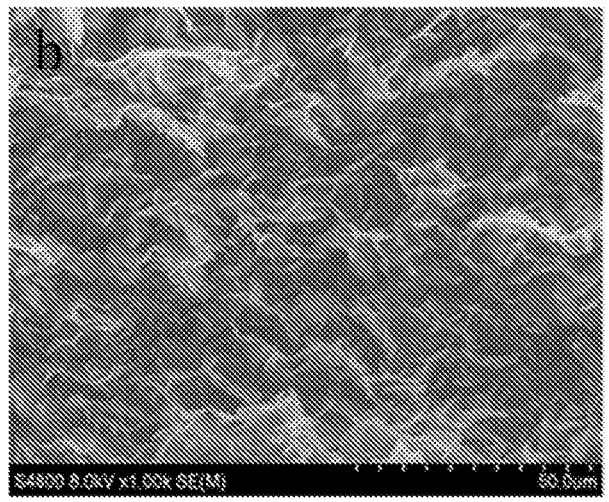
FIG. 4A          FIG. 4B
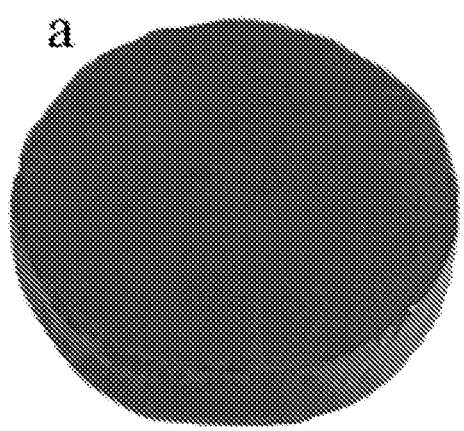
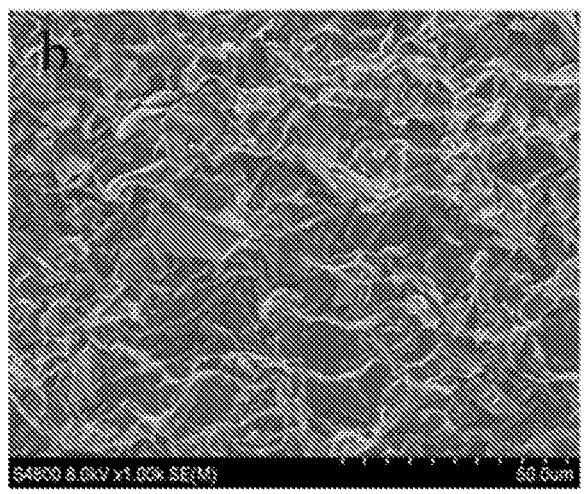
FIG. 5A          FIG. 5B

THERMALLY CONDUCTIVE THREE-DIMENSIONAL (3-D) GRAPHENE POLYMER COMPOSITE MATERIALS, METHODS OF MAKING, AND USES THEREOF

CROSS REFERENCE TO RELATED APPLICATIONS

This application is a national phase application under 35 U.S.C. § 371 of International Application No. PCT/IB2017/057669 filed Dec. 5, 2017, which claims the benefit of priority of Chinese Patent Application No. 201611161159.7 filed Dec. 15, 2016, all of which are hereby incorporated by reference in their entirety.

BACKGROUND OF THE INVENTION

A. Field of the Invention

The invention generally concerns thermally conductive three-dimensional (3-D) graphene-polymer composite materials. The materials can include a polymer impregnated within a porous 3-D graphene structure having a network of graphene layers that are attached to one another through a carbonized organic polymer bridging agent.

B. Description of Related Art

The rapid development and miniaturization of multi-function electronic devices has resulted in a need for improved thermally conductive materials to reduce the volume of electronic capacitors and to improve heat dissipation. In most instances, thermally conductive fillers can be added to polymeric materials to improve thermal conductive properties. Common fillers with high thermal conductivity include ceramics, metals, and the like. However, adding these conventional conductive fillers to polymeric materials has disadvantages. For example, the high amount of conductive filler required to achieve a desired thermal conductivity can be costly and can negatively affect the mechanical properties of the polymeric composition.

Graphene is an ultra-thin and ultra-light layered carbon material forming a two-dimensional honeycomb lattice with high mechanical strength, super conductivity, and high surface area. The coefficient of thermal conductivity of graphene can reach 5300 W/m·K, which is higher than that of carbon nanotubes (3000 W/m·K) and diamonds (2300 W/m·K). These excellent properties allow graphene-based materials to be ideal candidates for use as thermal conductive fillers in polymeric materials. However, one of the drawbacks of using graphene is that it has an affinity to conglomerate, which can negatively affect the formation of thermally conductive pathways inside the host polymeric material. This ultimately can lower thermal conduction of the resulting material.

Much effort has been devoted to use graphene as a thermally conductive filler in a variety of polymeric materials. For instance, Shahil et al., ("Graphene—Multilayer Graphene Nanocomposites as Highly Efficient Thermal Interface Materials" in *Nano Lett.*, 2012, 12(2), pp. 861-867) describes graphene and multilayer graphene epoxy nanocomposites. Huang et al., ("Three-Dimensional Graphene Foam and Carbon Fibers Reinforced Epoxy Resin Composites with Enhanced Thermal Conductivity" in *China Semiconductor Technology International Conference* 2016, 7463947) describes the thermal properties of reinforced epoxy resin composites containing graphene foam and carbon fibers separately, and, in combination. Liu et al., ("Exceptionally High Thermal and Electrical Conductivity of Three-Dimensional Graphene-Foam-Based Polymer Composites", *RSC Adv.*, 2016, 6, pp. 22364-22369) describes three-dimensional graphene-foam based epoxy composites.

Many of the aforementioned graphene-polymer materials suffer in that they require high concentrations of graphene materials to obtain increased thermal conductivities. High loading of graphene can be costly to manufacture and can potentially be destructive to the mechanical properties of the resulting material.

SUMMARY OF THE INVENTION

A solution to the problems associated with using graphene as a filler in polymeric materials has been discovered. The solution resides in the preparation of a porous 3-D graphene structure that has a network of graphene layers that are attached to one another through a carbonized organic polymer bridging agent. The bridging agent can help reduce or avoid the issues seen with coalescence of graphene layers and can aid in the formation of thermally conductive pores or channels throughout the 3-D graphene structure. Once formed, the porous 3-D graphene structure can be impregnated with a polymeric material, thus resulting in a graphene-polymer composite having improved thermal conductivity characteristics. Notably, the graphene-polymer composite can have a thermal conductivity of 1 W/m·K to 16.7 W/m·K at a temperature of 25° C. to 90° C., preferably 10 W/m·K to 16 W/m·K at a temperature of 25° C. to 90° C. The graphene-polymer composite of the present invention can be used in a wide array of applications and articles of manufacture, non-limiting examples of which include electronic devices such as light emitting diode (LED) lighting, notebooks, mobile computing devices (e.g., smart phones, tablets or laptops), etc.

Furthermore, the 3-D graphene-polymer composite can be made in an elegant and cost effective manner. By way of example, graphene and one or more bridging agents (e.g., polyvinyl alcohol (PVOH), polyvinylpyrrolidone (PVP), starch, etc.) can be dispersed in a mixture of water and organic solvent. After stirring and ultrasonication, the solution can be dried to obtain the 3D graphene assembly with a porous structure (e.g., graphene foam). Without wishing to be bound by theory, the spacing between the graphene layers can be controlled by regulating the surface tension of the mixed solution. The 3-D graphene assembly can be annealed at high temperature to carbonize the bridging agents to form the 3-D graphene structure having a network of graphene layers that are attached to one another through a carbonized organic polymer bridging agent. The resultant porous 3-D graphene structure contains thermally conductive graphene sheets that form thermally conductive pathways or channels throughout the 3-D structure to further increase heat conduction. Immersion of the 3-D graphene structure in a polymer material (e.g., epoxy resin) followed by curing produces the thermally conductive 3-D graphene-polymer composite material of the present invention.

Embodiments of the present invention disclose thermally conductive three-dimensional (3-D) graphene-polymer composite materials. A 3-D graphene-polymer composite material can include (a) a porous 3-D graphene structure comprising a network of graphene layers that are attached to one another through a carbonized organic polymer bridging agent, and (b) a polymer material impregnated within the porous 3-D graphene structure. The thermally conductive 3-D graphene-polymer composite material can have a thermal conductivity of 1 W/m·K to 16.7 W/m·K at a temperature of 25° C. to 90° C., preferably 10 W/m·K to 16 W/m·K at a temperature of 25° C. to 90° C. In one aspect, the thermally conductive 3-D graphene-polymer material can occupy at least 90 vol. %, preferably 95 vol. %, or more preferably 100 vol. % of the pores of the porous 3-D graphene structure. In another aspect, the thermally conductive 3-D graphene-polymer can include 5 wt. % to 20 wt. % of the carbonized organic polymer bridging agent, based on the total weight of the porous 3-D graphene structure. In other aspects, the composite material can include 80 wt. % to 95 wt. %, of the polymer material, based on the total weight of the thermally conductive 3-D graphene-polymer composite material. The graphene contained in the thermally conductive 3-D graphene-polymer composite can be unfunctionalized. In other aspects, the carbonized organic polymer bridging agent can be derived from a polymer or an oligomer including polyvinyl alcohol (PVOH), polyvinylpyrrolidone (PVP), starch, polyacrylonitrile (PAN), polydopamine (PDA), polyalkylene, polystyrene (PS), polyacrylate, polyester (PE), polycarbonate (PC), polyimide (PI), phenol formaldehyde resin, epoxy, polyalkylene glycol, polysaccharide, polyethylene (PE), polypropylene (PP), polymethylmethacrylate (PMMA), polyvinyl chloride (PVC), polyethylene terephthalate (PET), polyethylene glycol (PEG), polypropylene glycol (PPG), glycogen, cellulose, or chitin, or any combination thereof, preferably polyvinyl alcohol (PVOH), polyvinylpyrrolidone (PVP), or starch. Of these polymers, polyvinyl alcohol (PVOH), polyvinylpyrrolidone (PVP), starch, phenol formaldehyde resin, epoxy, polyalkylene glycol, polysaccharide, glycogen, cellulose, and chitin can be completely changed into amorphous carbon. In some instances, the polymer material used to impregnate the 3-D graphene structure can be a thermoset or thermoplastic material. Thermoset and thermoplastic materials include monomers, oligomers, polymer, or blends thereof. The thermoset material can include an epoxy resin, an unsaturated polyester resin, a polyurethane, bakelite, Duroplast, urea-formaldehyde, diallyl-phthalate polymer, an epoxy vinyl ester, a polyimide, an isocyanate resin, a polyisocyanate, dicyclopentadiene polymer, a phenolic, a poly(benzoxazine) polymer, a co-polymer thereof, or a blend thereof, preferably an epoxy resin. In one particular aspect where the thermoset material is an epoxy resin, preferably a bisphenol A resin that has been cured with a curing agent. Thermoplastic materials can include polyethylene terephthalate (PET), a polycarbonate (PC), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) or a derivative thereof, a thermoplastic elastomer (TPE), a terephthalic acid (TPA) elastomer, poly(cyclohexanedimethylene terephthalate) (PCT), polyethylene naphthalate (PEN), a polyamide (PA), polystyrene sulfonate (PSS), polyether ether ketone (PEEK), polyether ketone ketone (PEKK), acrylonitrile butyldiene styrene (ABS), polyphenylene sulfide (PPS), a co-polymer thereof, or a blend thereof. In another particular aspect, the carbonized organic polymer bridging agent includes at least 95 wt. % carbon, preferably 99 wt. % carbon, or more preferably 100 wt. % carbon, based on the total weight of the carbonized bridging agent.

In a particular embodiment, the thermally conductive 3-D graphene-polymer composite material can include a network of graphene layers containing a plurality of separate attachment points between the graphene layers and the carbonized organic polymer bridging agent. The carbonized organic polymer bridging agent can be derived from polyvinyl alcohol (PVOH), polyvinylpyrrolidone (PVP), or starch, and the porous 3-D graphene structure can be impregnated with an epoxy resin.

Embodiments for producing the thermally conductive 3-D graphene-polymer composite material of the present invention are described. A method can include (a) obtaining a dispersion of graphene layers and an organic carbon containing polymer in a solvent, (b) drying the dispersion to obtain a porous 3-D graphene structure including a network of graphene layers and the organic carbon containing polymer, (c) annealing the porous 3-D graphene structure from step (b) to carbonize the organic carbon containing polymer such that the graphene layers are attached to one another through the carbonized organic carbon containing polymer, (d) combining the annealed porous 3-D graphene structure from step (c) with a solution containing a thermoset or thermoplastic material under conditions sufficient to allow the solution to infiltrate the pores of and impregnate the annealed porous 3-D graphene structure; and (e) curing or drying the impregnated annealed porous 3-D graphene structure to obtain the thermally conductive 3-D graphene-polymer composite material of the present invention. In one aspect, the solvent in step (a) can be a mixed solvent including water and an organic solvent that is miscible with water and has a surface tension lower than that of water, preferably acetone or an alcohol such as methanol or ethanol, or any combination thereof. In another aspect, the ratio by volume of water to the organic solvent in the dispersion in step (a) can be 1:1 to 20:1, preferably 2:1 to 9:1. The concentration of the graphene layers in the dispersion in step (a) can be 2 mg/mL to 20 mg/mL, preferably 3 mg/mL to 10 mg/mL. In other aspects, the solution in step (d) includes a thermoset material and a curing agent, and the thermoset material can be cured after infiltrating the pores of the annealed porous 3-D graphene structure. The mass ratio of the thermoset polymer to the curing agent in step (d) can be 50:30 to 200:30, preferably 100:30. In one instance, the thermoset polymer can be an epoxy resin, preferably a bisphenol A epoxy resin, and the organic carbon containing polymer is a polyvinyl alcohol (PVOH), a polyvinylpyrrolidone (PVP), or a starch. In some instances, step (d) and/or step (e) can be performed under vacuum conditions, drying step (b) can be performed at a temperature of 60° C. to 85° C., preferably 75° C. to 80° C., and/or the annealing step (c) can be performed at a temperature of 400° C. to 1000° C., preferably 400° C. to 700° C.

In a further embodiment, the thermally conductive 3-D graphene-polymer composite material of the present invention can be used in an article of manufacture. In one aspect, the article of manufacture can be an electronic device. Non-limiting examples of such devices include a light emitting diode (LED) light or a computer (e.g., a laptop or notebook, a mobile computing device, a mobile phone, etc.).

In a particular aspect of the invention 20 embodiments are described. Embodiment 1 is A thermally conductive three-dimensional (3-D) graphene-polymer composite material comprising: (a) a porous 3-D graphene structure comprising a network of graphene layers that are attached to one another through a carbonized organic polymer bridging agent; and (b) a polymer material impregnated within the porous 3-D graphene structure, wherein the thermally conductive 3-D graphene-polymer composite material has a thermal conductivity of 1 W/m·K to 16.7 W/m·K at a temperature of 25°

C. to 90° C., preferably 10 W/m·K to 16 W/m·K at a temperature of 25° C. to 90° C. Embodiment 2 is the thermally conductive 3-D graphene-polymer composite material of embodiment 1, wherein the polymer material occupies at least 90 vol. %, preferably 95 vol. %, or more preferably 100 vol. % of the pores of the porous 3-D graphene structure. Embodiment 3 is the thermally conductive 3-D graphene-polymer composite material of any one of embodiments 1 to 2, comprising 5 wt. % to 20 wt. %, of the carbonized organic polymer bridging agent, based on the total weight of the porous 3-D graphene structure. Embodiment 4 is the thermally conductive 3-D graphene-polymer composite material of any one of embodiments 1 to 3, comprising 80 wt. % to 95 wt. %, of the polymer material, based on the total weight of the thermally conductive 3-D graphene-polymer composite material. Embodiment 5 is the thermally conductive 3-D graphene-polymer composite material of any one of embodiments 1 to 4, wherein the graphene is not functionalized. Embodiment 6 is the thermally conductive 3-D graphene-polymer composite material of any one of embodiments 1 to 5, wherein the carbonized organic polymer bridging agent is derived from polyvinyl alcohol (PVOH), polyvinylpyrrolidone (PVP), starch, polyacrylonitrile (PAN), polydopamine (PDA), polyalkylene, polystyrene (PS), polyacrylate, polyester (PE), polycarbonate (PC), polyimide (PI), phenol formaldehyde resin, epoxy, polyalkylene glycol, polysaccharide, polyethylene (PE), polypropylene (PP), polymethylmethacrylate (PMMA), polyvinyl chloride (PVC), polyethylene terephthalate (PET), polyethylene glycol (PEG), polypropylene glycol (PPG), glycogen, cellulose, or chitin, or any combination thereof, preferably polyvinyl alcohol (PVOH), polyvinylpyrrolidone (PVP), or starch. Embodiment 7 is the thermally conductive 3-D graphene-polymer composite material of any one of embodiments 1 to 6, wherein the polymer material is a thermoset or thermoplastic material. Embodiment 8 is the thermally conductive 3-D graphene-polymer composite material of embodiment 7, wherein the thermoset material comprises an epoxy resin, an unsaturated polyester resin, a polyurethane, bakelite, duroplast, urea-formaldehyde, diallyl-phthalate polymer, an epoxy vinylester, a polyimide, an isocyanate resin, a polyisocyanate, dicyclopentadiene polymer, a phenolic, a poly(benzoxazine) polymer, a co-polymer thereof, or a blend thereof, preferably an epoxy resin. Embodiment 9 is the thermally conductive 3-D graphene-polymer composite material of embodiment 8, wherein the thermoset material is an epoxy resin, preferably a bisphenol A resin, that has been cured with a curing agent. Embodiment 10 is the thermally conductive 3-D graphene-polymer composite material of embodiment 7, wherein the thermoplastic material comprises polyethylene terephthalate (PET), a polycarbonate (PC), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) or a derivative thereof, a thermoplastic elastomer (TPE), a terephthalic acid (TPA) elastomer, poly(cyclohexanedimethylene terephthalate) (PCT), polyethylene naphthalate (PEN), a polyamide (PA), polystyrene sulfonate (PSS), polyether ether ketone (PEEK), polyether ketone ketone (PEKK), acrylonitrile butyldiene styrene (ABS), polyphenylene sulfide (PPS), a co-polymer thereof, or a blend thereof. Embodiment 11 is the thermally conductive 3-D graphene-polymer composite material of any one of embodiments 1 to 10, wherein the carbonized organic polymer bridging agent is derived from polyvinyl alcohol (PVOH), polyvinylpyrrolidone (PVP), or starch, and the porous 3-D graphene structure is impregnated with an epoxy resin.

Embodiment 12 is a method of making the thermally conductive 3-D graphene-polymer composite material of any one of embodiments 1 to 11, the method comprising: (a) obtaining a dispersion of graphene layers and an organic carbon containing polymer in a solvent; (b) drying the dispersion to obtain a porous 3-D graphene structure comprising a network of graphene layers and the organic carbon containing polymer; (c) annealing the porous 3-D graphene structure from step (b) to carbonize the organic carbon containing polymer such that the graphene layers are attached to one another through the carbonized organic carbon containing polymer; (d) combining the annealed porous 3-D graphene structure from step (c) with a solution comprising a thermoset or thermoplastic material under conditions sufficient to allow the solution to infiltrate the pores of and impregnate the annealed porous 3-D graphene structure; and (e) curing or drying the impregnated annealed porous 3-D graphene structure to obtain the thermally conductive 3-D graphene-polymer composite material of any one of embodiments 1 to 11. Embodiment 13 is the method of embodiment 12, wherein the solvent in step (a) is a mixed solvent comprising water and an organic solvent that is miscible with water and has a surface tension lower than that of water, preferably acetone or an alcohol such as methanol or ethanol, or any combination thereof. Embodiment 14 is the method of any one of embodiments 12 to 13, wherein the ratio by volume of water to the organic solvent in the dispersion in step (a) is 1:1 to 20:1, preferably 2:1 to 9:1. Embodiment 15 is the method of any one of embodiments 12 to 14, wherein the concentration of the graphene layers in the dispersion in step (a) is 2 mg/mL to 20 mg/mL, preferably 3 mg/mL to 10 mg/mL. Embodiment 16 is the method of any one of embodiments 12 to 15, wherein the solution in step (d) comprises a thermoset material and a curing agent, and step (e) comprises curing the thermoset material after infiltrating the pores of the annealed porous 3-D graphene structure. Embodiment 17 is the method of embodiment 16, wherein the mass ratio of the thermoset material to the curing agent in step (d) is 50:30 to 200:30, preferably 100:30. Embodiment 18 is the method of embodiment 17, wherein the thermoset material is an epoxy resin, preferably a bisphenol A epoxy resin, and the organic carbon containing polymer is polyvinyl alcohol, polyvinylpyrrolidone, or starch. Embodiment 19 is the method of any one of embodiments 12 to 18, wherein the drying step (b) is performed at a temperature of 60° C. to 85° C., preferably 75° C. to 80° C., and/or the annealing step (c) is performed at a temperature of 400° C. to 1000° C., preferably 400° C. to 700° C. Embodiment 20 is an article of manufacture comprising the thermally conductive 3-D graphene-polymer composite material of any one of embodiments 1 to 11, preferably an electronic device, and more preferably a light emitting diode light, a notebook, a mobile phone, or a mobile computing device.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa.

The following includes definitions of various terms and phrases used throughout this specification.

The term "graphene" refers to a thin sheet of carbon atoms (e.g., usually one-atom thick) arranged in a hexagonal format or a flat monolayer of carbon atoms that are tightly packed into a 2D honeycomb lattice (e.g., $sp_2$-bonded carbon atoms). In the context of the present invention, "graphene" also encompasses a stack of graphene sheets or monolayers graphene stack having 2, 3, 4, 5, 6, 7, 8, 9, or 10, or more sheets or monolayers).

The term "substantially" and its variations are defined to include ranges within 10%, within 5%, within 1%, or within 0.5%.

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The 3-D graphene-polymer composite materials of the present invention and uses thereof can "comprise," "consist essentially of," or "consist of" particular ingredients, components, compositions, etc. disclosed throughout the specification. With respect to the transitional phase "consisting essentially of," in one non-limiting aspect, a basic and novel characteristic of the 3-D graphene-polymer composite material of the present invention is that the graphene network in combination with the carbonized polymeric bridges form 3-D pathways for heat conduction and/or for being impregnated with polymeric material.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

FIG. 4A is a digital image of a 3-D graphene structure of the present invention

FIG. 4B is a scanning electron microscope (SEM) image of the 3-D graphene structure of FIG. 4A.

FIG. 5A is a digital image of 3-D graphene-polymer composite material of the present invention.

FIG. 5B is a SEM image of the composite material of FIG. 5A.

Figure 1:
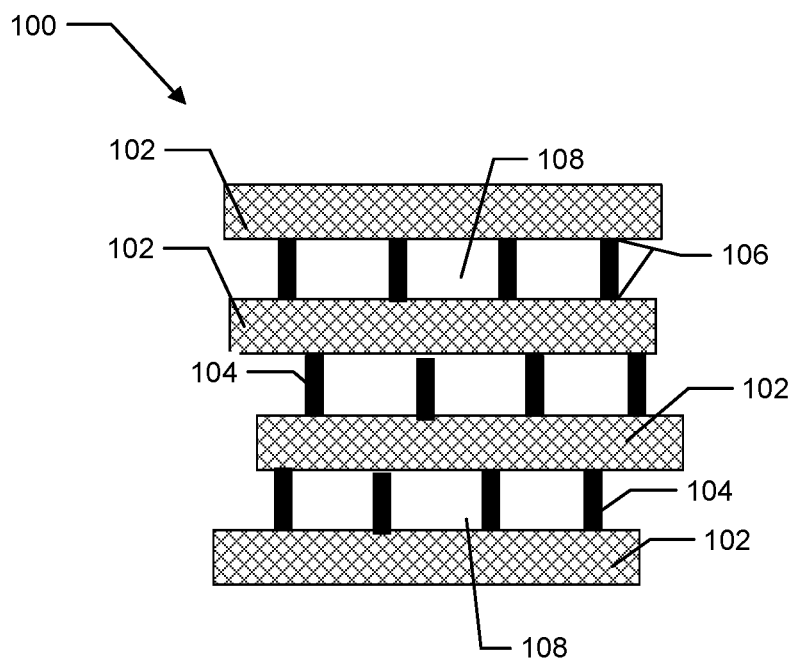
FIG. 1 is a cross-sectional illustration of a 3-D graphene structure of the present invention with carbonized organic polymer bridging agents.

While the invention is susceptible to various modifications and alternative forms, specific embodiments thereof are shown by way of example in the drawings and may herein be described in detail. The drawings may not be to scale.

DETAILED DESCRIPTION OF THE INVENTION

A discovery has been identified that overcomes the problems associated with using graphene as a thermal conductive filler in polymeric materials. The discovery is premised on using a porous 3-D graphene structure having a network of separated graphene layers. The layers are attached together, but separated, by a carbonized organic polymer bridging agent, which can reduce or avoid coalescence or collapsing of the graphene layers. Such separation produces pathways for thermal conductivity. The 3-D graphene structure can then be impregnated with polymerized or polymerizable material and, if needed, cured, to form a 3-D graphene-polymer composite material useful in electronic applications (e.g., LED lights, notebooks, mobile phones, etc.).

These and other non-limiting aspects of the present invention are discussed in further detail in the following sections with reference to the figures.

A. Thermally Conductive 3-D Graphene-Polymer Composite Material

The thermally conductive 3-D graphene-polymer composite material of the present invention can include a network of graphene layers that are attached with an organic polymer bridging agent. Referring to FIG. 1, a cross-sectional illustration of a 3-D graphene structure 100 of the present invention is depicted. 3-D graphene structure 100 can include graphene layers 102 and carbonized organic polymer bridging agents 104. Carbonized organic polymer bridging agents 104 can attach to graphene layers 102 at attachment points 106 such that graphene layers 102 separate to form gaps 108. Formation of gaps 108 between graphene layers 102 provide thermal conductive pathways for heat dissipation in the final composite material and/or provide space for polymeric material. 3-D graphene structure 100 can be a foam structure, a honeycomb structure, or a mesh structure. In a preferred embodiment, the 3-D graphene structure 100 is a foam (See, FIGS. 4 and 5 of the Examples).

In one aspect, the carbonized organic polymer bridging agent includes at least 95 wt. % carbon, preferably 99 wt. % carbon, or more preferably 100 wt. % carbon, based on the total weight of the carbonized bridging agent. Said another way, the organic polymer bridging agent undergoes substantially complete conversion to carbon, and little, to substantially no original/non-carbonized organic polymer bridging agent is present in the 3-D graphene structure. In another aspect, the thermally conductive 3-D graphene-polymer can include 5 wt. % to 50 wt. % and all ranges there between (e.g., 6, 7, 8, 9, 10, 11, 12, 13, 14, 15, 16, 17, 18, 19, 20, 25, 30, 35, 40, 45, 50 wt. %) of the carbonized organic polymer bridging agent, based on the total weight of the porous 3-D graphene structure. Determination of the carbonized polymer bridging agent can be done by calculation. By way of example, the amount of carbonized organic bridging agent can be calculated using the initial amount of added organic polymer bridging agent and the weight content of all carbon materials (including graphene and carbonized organic bridging agent) in combination with the weight retention of organic bridging agent after carbonization determined by thermogravimetric analysis (TGA).

Figure 2:
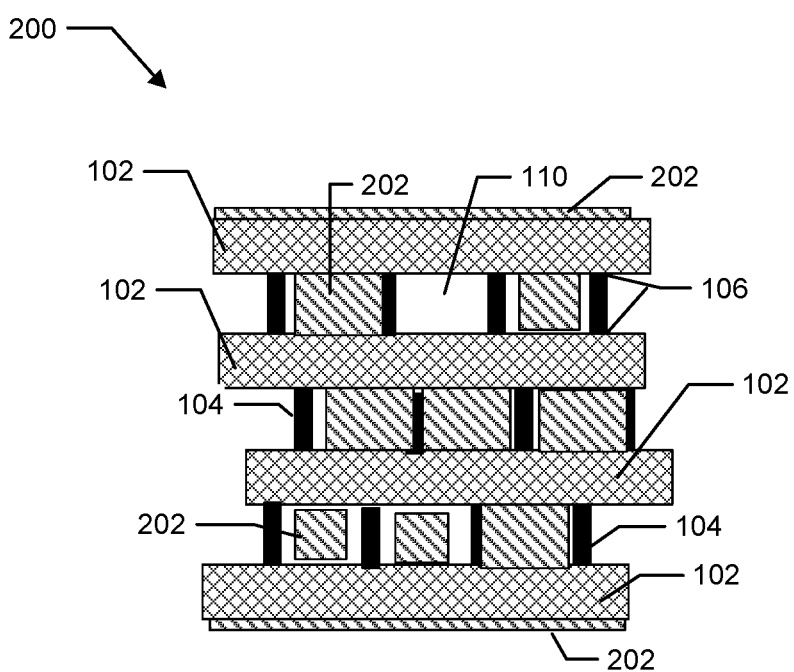
FIG. 2 is a cross-sectional illustration of a 3-D graphene polymer composite of the present invention with carbonized organic polymer bridging agents and impregnated with a polymeric material.

FIG. 2 depicts a cross-sectional illustration of the 3-D graphene-polymer composite material 200 ("composite material") of the present invention. Composite material 200 can include 3-D graphene structure 100 and polymer material 202. As shown, polymer material 202 can be impregnated in graphene layers and fill or partially fill gaps 108. In some embodiments, all gaps are filled with polymer material 202. The outer surface of the composite material can be a mixture of graphene layers 102 and polymer 202. Graphene layers 102 provide mechanical strength to the composite, while gaps 108 provide thermal conductivity pathways. In a preferred embodiment, 3-D graphene-polymer composite material 200 is a graphene-polymer foam (See, FIGS. 4 and 5 of the Examples).

In one aspect, the polymer material impregnated within the porous 3-D graphene structure occupies at least 90 vol. % or more (e.g., 91, 92, 93, 94, 95, 96, 97, 98, 99, or 100 vol. %) of the pores of the porous 3-D graphene structure. Preferably, the impregnated polymer material occupies 95 vol. %, or more preferably, 100 vol. %, of the pores of the porous 3-D graphene structure. In other aspects, the composite material can include 80 wt. % to 95 wt. % and all values and ranges there between (e.g., 81, 82, 83, 84, 85, 86, 87, 88, 89, 90, 91, 92, 93, or 94 wt. %) of the polymer material, based on the total weight of the thermally conductive 3-D graphene-polymer composite material. In other particular instances, the carbonized organic polymer bridging agent 104 can be derived from polyvinyl alcohol (PVOH), polyvinylpyrrolidone (PVP), or starch, and the porous 3-D graphene structure 100 can be impregnated with an epoxy resin.

In certain aspects, the thermally conductive 3-D graphene-polymer composite material of the present invention has high thermal conductivity compared to conventional graphene-polymer materials. Thermal conductivity can be measured quantitatively by processes known by those of ordinary skill in the art. By way of example, thermal conductivities can be measured by a light flash method using a Netzsch LFA447 NanoFlash instrument. In a particular aspect, the thermally conductive 3-D graphene-polymer composite material can have a thermal conductivity of 1 W/m·K to 16.7 W/m·K and all values and ranges there between (e.g., 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, or 16.6 W/m·K) at a temperature of 25° C. to 90° C. and all values and ranges there between (e.g., 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89° C.). In some embodiments, the thermally conductive 3-D graphene-polymer composite material is 10 W/m·K to 17 W/m·K, or about 10.9 W/m·K or about 16.69 W/m·K at a temperature of 25° C. to 90° C.

B. Methods for Making Thermally Conductive 3-D Graphene-Polymer Material

Figure 3:
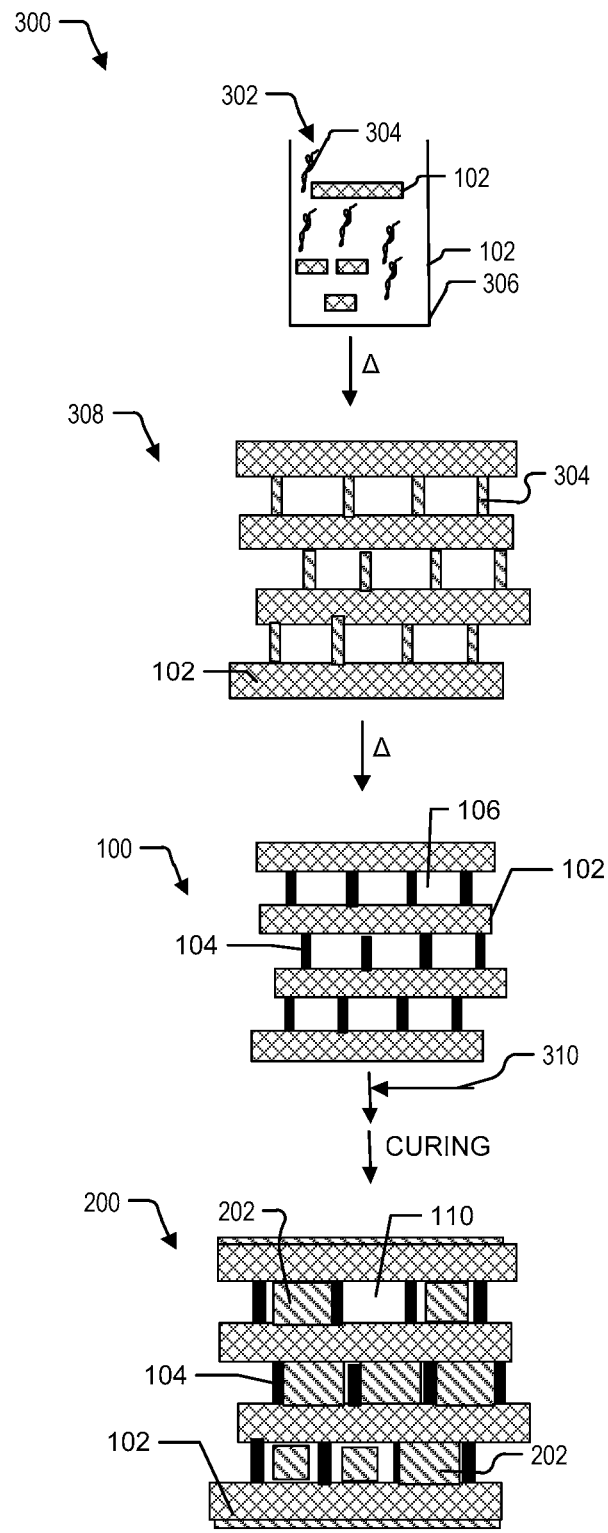
FIG. 3 is an illustration of a method to produce a 3-D graphene polymer composite of the present invention.

The thermally conductive 3-D graphene-polymer composite material of the present invention can be prepared by processes known to those of ordinary skill in the art (e.g., solution chemistry, sonication, annealing, lyophilization, curing, concentration, impregnation, or a combination thereof). FIG. 3 depicts a method of preparing the thermally conductive 3-D graphene-polymer composite material of the present invention. In method 300, dispersion 302 of graphene layers 102 and organic carbon containing polymer 304 in a solvent (not shown) can be obtained. The solvent can be a mixed solvent including water and an organic solvent that is miscible with water and has a surface tension lower than that of water. Non-limiting examples of solvents include acetic acid, acetone, diethyl ether, methanol, ethanol, isopropanol, and glycerol to name a few. Preferably, the solvent is a mixture of water and acetone or an alcohol such as methanol or ethanol, or any combination thereof, which have a lower surface tension than water. Without wishing to be bound by theory, it is believed that by adjusting the surface tension of the solution the space between graphene laminae can be modulated as desired. In this way, the prepared 3-D porous graphene structure having graphene laminae in the graphene structure stack become a loose microstructure having a certain gap, which forms a complete thermal conductive pathway. Adjusting the space between graphene laminae can be advantageous in the design of articles of manufacture having increased thermally conductive needs, such as in LED lights, notebooks, or mobile computing devices. In another aspect, the ratio by volume of water to the organic solvent in the dispersion in step 1 can be 1:1 to 20:1 and all values and ranges there between (e.g., 2:1, 3:1, 4:1, 5:1, 6:1, 7:1, 8:1, 9:1, 10:1, 11:1, 12:1, 13:1, 13:1, 14:1, 15:1, 16:1, 17:1, 18:1, or 19:1), preferably 2:1 to 9:1. The concentration of graphene layers 102 in dispersion 302 can be 2 mg/mL to 20 mg/mL and all values and ranges there between (e.g., 3, 4, 5, 6, 7, 8, 9, 10, 11, 12, 13, 14, 15, 16, 17, 18, or 19 mg/mL), preferably 3 mg/mL to 10 mg/mL. The organic polymer bridging agent 304 can be any polymer capable of being carbonized. In a preferred embodiment, the organic polymer bridging agent 304 can be polyvinyl alcohol (PVOH), polyvinylpyrrolidone (PVP), or starch. The percent of organic polymer bridging agent 304 can range from 5 wt. % to 100 wt. %, 10 wt. % to 50 wt. %, 20 wt. % to 40 wt. % or any value or range there between (e.g., 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, or 95 wt. %) relative to the total weight of graphene used. The dispersion can be mixed using known mixing methods for a time period sufficient to disperse the graphene and polymer (e.g., ultrasonicated). Dispersion 302 can be placed in drying chamber 306. Drying chamber 306 can have any length to diameter ratio. Embodiments of ratios include 1.2:1 to 3:1, 1.3 to 2.5:1, 1.5:1 to 2.0:1, or any ratio there between. In some embodiments, drying chamber is a blast-drying chamber. Dispersion 302 can be heat-treated (e.g. dried) to remove the solvent and assembly the graphene layers 102 and polymer into porous 3-D graphene structure 308 having a network of graphene layers 102 and organic carbon containing polymer 304 separating the graphene layers. Heat-treating conditions include a temperature of 60° C. to 85° C. and all temperatures and ranges there between (e.g., 61, 62, 63, 64, 65, 66, 67, 68, 69, 70, 71, 72, 73, 74, 75, 76, 77, 78, 79, 80, 81, 82, 83, or 84° C.), preferably 75° C. to 80° C.

Dried porous 3-D graphene structure 308 can be subjected to an annealing process to form the porous 3-D graphene structure 100. By way of example, the dried sample can be removed from the drying chamber, and then placed in another vessel for annealing. In the annealing process, the porous 3-D graphene structure 308 including a network of graphene layers 102 and the organic carbon containing polymer 304 is brought to a temperature sufficient to carbonize the organic carbon containing polymer, kept there for a time, and then cooled to room temperature (e.g., 20 to 35° C.). During the annealing process, without wishing to be bound by theory, it is believed that carbonized organic carbon containing polymer 304 attaches graphene layers 102 to one another to form 3-D graphene structure 100. Annealing temperatures can range from 400° C. to 1000° C., preferably 400° C. to 700° C. and all temperatures and ranges there between (e.g., 401, 410, 425, 450, 500, 550, 600, 650, 700, 750, 800, 850, 900, 950, 975, 990, or 999° C.)

Annealed porous 3-D graphene structure 100 can be contacted with polymer-precursor material or polymer material 310 and subjected to conditions sufficient to form porous 3-D graphene-polymer composite material 200. Polymer or polymer precursor material 310 can include a thermoset or thermoplastic material (polymer, oligomer, monomer, or blend thereof). When a thermoset material is used, such conditions can promote a chemical reaction that transforms the polymer or polymer precursor material from a liquid to solid (e.g., through polymerization and/or crosslinking of monomers, oligomers, polymers or blends thereof).

In one embodiment, a solution of polymer material or polymer precursor material 310 can be obtained, and porous 3-D graphene structure 100 can be contacted (e.g., immersed in to the solution) under conditions sufficient to allow the solution to infiltrate the pores of and gaps 106 of annealed porous 3-D graphene structure 100. The weight ratio of polymer material or polymer precursor material to 3-D graphene structure 100 can be 80:20 to 92:8, preferably 85:15 to 88:12.

In some embodiments, the solution of polymer material or polymer precursor material can include a curing agent. The curing agent can promote polymerization, crosslinking or other chemical reactions that transforms the polymer material or polymer precursor material into a solid polymer. The mass ratio of the polymer material or polymer precursor material to the curing agent can be 50:30 to 200:30 and all ratios and ranges there between (e.g., 51:30, 52:30, 53:30, 54:30, 55:30, 56:30, 57:30, 58:30, 59:30, 60:30, 61:30, 62:30, 63:30, 64:30, 65:30, 66:30, 67:30, 68:30, 69:30, 70:30, 71:30, 72:30, 73:30, 74:30, 75:30, 76:30, 77:30, 78:30, 79:30, 80:30, 81:30, 82:30, 83:30, 84:30, 85:30, 86:30, 87:30, 88:30, 89:30, 90:30, 91:30, 92:30, 93:30, 94:30, 95:30, 96:30, 97:30, 98:30, 99:30, 100:30, 101:30, 102:30, 103:30, 104:30, 105:30, 106:30, 107:30, 108:30, 109:30, 110:30, 111:30, 112:30, 113:30, 114:30, 115:30, 116:30, 117:30, 118:30, 119:30, 120:30, 121:30, 122:30, 123:30, 124:30, 125:30, 126:30, 127:30, 128:30, 129:30, 130:30, 131:30, 132:30, 133:30, 134:30, 135:30, 136:30, 137:30, 138:30, 139:30, 140:30, 143:30, 142:30, 143:30, 144:30, 145:30, 146:30, 147:30, 148:30, 149:30, 150:30, 151:30, 152:30, 153:30, 154:30, 155:30, 156:30, 157:30, 158:30, 159:30, 160:30, 161:30, 162:30, 163:30, 164:30, 165:30, 166:30, 167:30, 168:30, 169:30, 170:30, 171:30, 172:30, 173:30, 174:30, 175:30, 176:30, 177:30, 178:30, 179:30, 180:30, 181:30, 182:30, 183:30, 184:30, 185:30, 186:30, 187:30, 188:30, 189:30, 190:30, 191:30, 192:30, 193:30, 194:30, 195:30, 196:30, 197:30, 198:30, or 199:30). Preferably, the mass ratio is 100:30.

The impregnated 3-D graphene structure can be subjected to conditions suitable to cure the polymer material or polymer precursor material and form porous 3-D graphene-polymer composite material 200. Curing conditions can include ultraviolet irradiation, heating, or electromagnetic radiation. In one embodiment, the impregnated 3-D graphene structure is heated to 60° C. to 85° C. and all temperatures and ranges there between (e.g., 61, 62, 63, 64, 65, 66, 67, 68, 69, 70, 71, 72, 73, 74, 75, 76, 77, 78, 79, 80, 81, 82, 83, or 84° C.), preferably 75° C. to 80° C., under atmospheric pressure (e.g. 0.101 MPa). In some embodiments, the curing can include heating under vacuum (e.g., less than 0.101 MPa to 0.0101 MPa). In one instance, the polymer material or polymer precursor material can be thermoset material such as an epoxy resin, preferably a bisphenol A epoxy resin, in combination with a curing agent (e.g., a mixture of amines). When a thermoplastic polymer is used, the thermoplastic polymer can be heated until it liquefies or softens enough to be processed and the 3-D graphene structure is immersed in the hot thermoplastic material and then cooled to room temperature.

An exemplary method of making the porous 3-D graphene composite material can include the following. Graphene and a carbonizable organic polymer bridging agent (e.g., PVP, PVOH, starch, etc.) can be homogeneously dispersed in an alcohol (e.g., ethanol) and water mixture to obtain a graphene dispersion liquid that can be subjected to ultrasound at a particular power and duration. The mixture can then be placed into a blast-drying chamber at a particular temperature and dried for a particular amount of time to obtain a three-dimensional graphene structure. The dried structure can then be annealed by slowing increasing the temperature until a suitable temperature is reached, holding for a certain amount of time, and then cooling to room temperature. The annealed structure can then be immersed into a mixed solution of thermoset material (e.g., epoxy resin) and a curing agent, placed under vacuum for a certain amount of time, and then cured at a certain temperature and duration. The resultant thermally conductive 3-D graphene-polymer composite material can then be tested for thermal conductivity.

C. Materials

1. Graphene

Graphene is an ultra-thin and ultra-light layered carbon material forming a two-dimensional honeycomb lattice with high mechanical strength, super conductivity, and high surface area. Graphene is commercially available from many sources. A non-limiting example of a source of graphene is Sigma-Aldrich® (USA) or Ningbo Morsh Tech. Co., Ltd., (China). In a preferred aspect, the graphene has not been functionalized (e.g., not oxidized to form graphene oxide)

2. Organic Polymer Bridging Agent and Polymer Material a. Organic Polymer Bridging Agent The organic polymer bridging agent can be any organic polymer capable of being converted to carbon. Carbonization of the organic polymer bridging agent can result in at least 95%, at least 98%, or about 100% of the polymer being converted to carbon. Non-limiting examples of organic polymers suitable for use as bridging agents include polyvinyl alcohol (PVOH), polyvinylpyrrolidone (PVP), starch, polyacrylonitrile (PAN), polydopamine (PDA), polyalkylene, polystyrene (PS), polyacrylate, polyester (PE), polycarbonate (PC), polyimide (PI), phenol formaldehyde resin, epoxy, polyalkylene glycol, polysaccharide, polyethylene (PE), polypropylene (PP), polymethylmethacrylate (PMMA), polyvinyl chloride (PVC), polyethylene terephthalate (PET), polyethylene glycol (PEG), polypropylene glycol (PPG), glycogen, cellulose, or chitin, or any combination thereof. Of these polymers, polyvinyl alcohol (PVOH), polyvinylpyrrolidone (PVP), starch, phenol formaldehyde resin, epoxy, polyalkylene glycol, polysaccharide, glycogen, cellulose, and chitin can be completely converted into amorphous carbon.

b. Polymer Material

The polymer material used to form the composite material can be derived from a thermoset, or blends thereof, or a thermoplastic material or blends thereof. Thermoset and thermoplastic materials include polymers, oligomers, monomers or blends thereof. The polymer material can be made from a composition having the thermoset and/or thermoplastic material(s) in combination with other polymers, additives, and the like. Non-limiting examples of additives include curing agents, antioxidants, heat stabilizers, flow modifiers, colorants, etc., or any combinations thereof.

Thermoplastic polymers include polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine (PEI) and its derivatives, polyetherimide and its derivatives, thermoplastic elastomer (TPE), terephthalic acid (TPA) elastomers, poly(cyclohexanedimethylene terephthalate) (PCT), polyethylene naphthalate (PEN), polyamide (PA), polystyrene sulfonate (PSS), sulfonated polystfamily of polymers, polyether ether ketone (PEEK), or combinations or blends thereof.

Thermoset polymeric matrices are cured or become cross-linked and tend to lose the ability to become pliable or moldable at raised temperatures. Non-limiting examples of thermoset polymers include epoxy resins, epoxy vinylesters, alkyds, amino-based polymers (e.g., polyurethanes, urea-formaldehyde), diallyl phthalate polymer, phenolic polymers, polyesters, unsaturated polyester resins, dicyclopentadiene polymer, polyimides, silicon polymers, an isocyanate resin, a polyisocyanate, thermosetting polyacrylic resins, phenol formaldehyde resin (bakelite), fiber reinforced phenolic resins (Duroplast), benzoxazines, or co-polymers thereof, or blends thereof. In addition to these, other thermoset polymers known to those of skill in the art, and those hereinafter developed, can also be used in the context of the present invention. In some embodiments, one or more monomers capable of being polymerized when exposed to heat, light or electromagnetic force are used. Such monomers can be precursor materials suitable for forming thermoset polymers. The thermoset polymer material of the present invention can include an epoxy resin, an unsaturated polyester resin, a polyurethane, bakelite, Duroplast, urea-formaldehyde, diallyl-phthalate polymer, an epoxy vinylester, a polyimide, an isocyanate resin, a polyisocyanate, dicyclopentadiene polymer, a phenolic, a poly(benzoxazine) polymer, a co-polymer thereof, or a blend thereof. Preferably, the thermoset polymer material is an epoxy resin. Epoxy resins are low molecular weight monomers, oligomers, or polymers, which normally contain at least two epoxide groups. The epoxide group is also sometimes referred to as a glycidyl or oxirane group. The term "epoxy" is used to denote both the basic components and the cured end products of epoxy resins, as well as a colloquial name for the epoxide functional group. Epoxy resins, also known as polyepoxides, are a class of reactive perpolymers and polymers which contain epoxide groups. Epoxy resins may be reacted (e.g., cross-linked) either with themselves through thermal or catalytic homopolymerisation, or with a wide range of co-reactants including polyfunctional amines, acids (and acid anhydrides), phenols, alcohols and thiols. These co-reactants are often referred to as hardeners or curatives, and the cross-linking reaction is commonly referred to as curing. Reaction of polyepoxides with themselves or with polyfunctional hardeners forms a thermosetting polymer, often with high mechanical properties, temperature and chemical resistance. Typical epoxy thermoset materials for use in the present invention can be diglycidyl ethers of dihydric phenols including diglycidyl ethers of resorcinol, hydroquinone, 4,4'-isopropylidene bisphenol (bisphenol A), 4,4'-dihydroxydiphenylethylmethane, 3,3'-dihydroxy-diphenyldiethylmethane, 3,4'-dihydroxydiphenyl-methylpropylmethane, 4,4'-dihydroxydiphenyloxide, 4,4'-dihydroxydiphenylcyanomethane, 4,4'-dihydroxy-biphenyl, 4,4'-dihydroxybenzophenone (bisphenol K), 4,4'-dihydroxydiphenyl sulfide, 4,4'-dihydroxydiphenyl sulfone, 2,6-dihydroxynaphthalene, 1,4'-dihydroxy-naphthalene, catechol, 2,2-bis(4-hydroxyphenyl)-acetamide, 2,2-bis(4-hydroxyphenyl)ethanol, 2,2-bis(4-hydroxyphenyl)-N-methylacetamide, 2,2-bis(4-hydroxy-phenyl)-N,N-dimethylacetamide, 3,5-dihydroxyphenyl-acetamide, 2,4-dihydroxyphenyl-N-(hydroxyethyl)-acetamide, as well as mixtures of one or more of such diglycidyl ethers. Without being limited by theory, other epoxy thermoset resins can also be envisioned including bisphenol F epoxy resin, novolac epoxy resin, an aliphatic epoxy resin (e.g., dodecanol glycidyl ether, butanediol diglycidyl ether, trimethylolpropane triglycidyl ether, 3,4-epoxycyclohexylmethyl-3,4-epoxycyclohexane carboxylate, etc.) and glycidylamine epoxy resin [e.g., triglycidyl-p-aminophenol (functionality 3) and N,N',N'',N'''-tetraglycidyl-bis-(4-aminophenyl)-methan (functionality 4), etc.] to name a few. In one particular aspect, the thermoset material is an epoxy resin, preferably bisphenol A resin, and the resin has been cured with a curing agent. Typical curing agents include phenolics, amines, carboxylic acids, phenol formaldehyde resins, and anhydrides to name a few. A preferred epoxy resin and curing agent is an epoxy copolymer of 70-100% 4,4-isopropylidenediphenol-epichlorohydrin copolymer and 0-30% 1,6-hexanediol diglycidyl ether and a curing agent of a mixture of 25-50% alkyletheramine, 20-25% isophoronediamine and up to 20% aminoethylpiperazine, which are sold under the tradenames EPIKOTE™ Resin MGS® RIMR 135 and RIMH 1366 (HEXION™ Specialty Chemicals), respectively. The polymers may also be self-cured through an intrinsic hydroxyl group or an epoxy group. Preferably, the curing agent is diglycidyl ether of bisphenol A in combination with an amine curing agent.

D. Uses of the Produced Thermally Conductive 3-D Graphene-Polymer Material

The produced thermally conductive 3-D graphene-polymer composite material of the present invention can be used in a wide range of applications and electronic devices.

Non-limiting examples include electronic display devices, photovoltaic cells, light irradiation devices and decorative illumination devices, electromagnetic radiation shield devices, any device which uses a reflective electrode, etc. Electronic display devices include, but are not limited to, an electroluminescent (EL) device (e.g., an organic light emitting display (OLED)), an electrophoretic display (e-paper), an electrochromic device, a liquid crystal display device (e.g., transflective liquid crystal display (LCD) devices) or an electrowetting display device. Non-limiting examples of photovoltaic cells include an amorphous silicon (a-Si) cells. Non-limiting examples of light irradiation devices and decorative illumination devices include devices containing light-emitting elements such as light-emitting diodes and semiconductor lasers. Non-limiting examples of additional electronic devices include a transistor, a resistor, a logic device, sensors, antennas, integrated circuits, electroluminescence devices, memory elements or a field effect device. In preferred aspects of the invention, the thermally conductive 3-D graphene-polymer composite material can be used in article of manufactures that includes an electronic device, preferably a LED light, a notebook, or a mobile computing device such as a smart phone. In some embodiments, the article of manufacture is a virtual reality device, an augmented reality device, a fixture that requires flexibility such as an adjustable mounted wireless headset and ear buds, a communication helmet with curvatures, a medical patch, a flexible identification card, a flexible sporting good, a packaging material and applications where the energy source can simply final product design, engineering and mass production.

In some instances, the flexible composites of the present invention can enhance energy density and flexibility of flexible supercapacitors (FSC). The resultant flexible composites can include an open two-dimensional surface of graphene that can contact an electrolyte in the FSC. Moreover, the conjugated π electron (high-density carrier) of graphene can minimize the diffusion distances to the interior surfaces and meet fast charge-discharge of supercapacitors. Further, micropores of the composites of the present invention can strengthen the electric-double-layer capacitance, and mesopores can provide convenient pathways for ions transport.

EXAMPLES

The present invention will be described in greater detail by way of prophetic examples. The following examples are offered for illustrative purposes only, and are not intended to limit the invention in any manner. Those of skill in the art will readily recognize a variety of noncritical parameters, which can be changed or modified to yield essentially the same results.

Materials

Graphene was obtained from Ningbo Morsh Tech. Co., Ltd., China. Polyvinyl alcohol (PVOH), Polyvinylpyrrolidone (PVP), and starch were obtained from Aladdin Reagent, China. Epoxy resin was EPIKOT Resin MGS® RIMR135 and RIMH1366 obtained from Hexion, USA. Thermal conductivity was measured using a Netzsch LFA447 NanoFlash®, (NETZSCH-GERATEBAU, GmBH, Germany).

Example 1

Preparation of a Graphene-PVP Composite

Graphene (40 g, 5 wt. %) and PVP (8 g, 100 wt. %, relative to graphene) were combined with a 2:1 ethanol (333 mL) and water (167 mL) mixture to obtain a 4 mg/mL graphene solution. The solution was subjected to ultrasound at a power of 1200 Wh for 10 mins. to homogeneously disperse the graphene. The dispersion was then placed in a blast-drying chamber and dried at 80° C. for 72 hours to obtain the 3-D graphene polymer structure. The 3-D graphene polymer structure was removed from the blast-drying chamber, cooled to room temperature, and then annealed in an oven at 5° C./min to 500° C. and held at that temperature for 2 hours to carbonize the polymer and produce the three-dimensional graphene structure of the present invention. FIG. 4A depicts the three-dimensional graphene structure (foam) of the present invention and FIG. 4B is a SEM image thereof. The annealed structure was immersed into a solution of epoxy resin (15 g) and curing agent (4.5 g) at 100:30 mass ratio, placed under vacuum (0.1 atm) for 1 hour, and then heated at 70° C. for 4 hours to cure the epoxy resin and form the porous 3-D thermally conductive material of the present invention. FIG. 5A depicts the three-dimensional graphene polymer composite material of the present invention and FIG. 5B is a SEM image thereof. The resultant thermally conductive plastic was measured to have a thermal conductivity of 11.03 W/m·K.

Example 2

Preparation of a Graphene-PVOH Composite

Graphene (30 g, 5 wt. %) and PVOH (15 g, 50 wt. %, relative to graphene) were combined with a 3:1 ethanol (375 mL) and water (125 mL) mixture to obtain a 3 mg/mL graphene solution. The solution was subjected to ultrasound at a power of 1200 Wh for 10 mins to homogeneously disperse the graphene. The dispersion was then placed in a blast-drying chamber and dried at 80° C. for 72 hours to obtain the 3-D graphene polymer structure. The 3-D graphene polymer structure was removed from the blast-drying chamber, cooled to room temperature, and then annealed in an oven at 5° C./min to 500° C. and held at that temperature for 2 hours to carbonize the polymer and produce the three-dimensional graphene structure of the present invention. The annealed structure was immersed into a solution of epoxy resin (15 g) and curing agent (4.5 g) at 100:30 mass ratio, placed under vacuum (0.1 atm) for 1 hour, and then heated at 70° C. for 4 hours to cure the epoxy resin and form the porous 3-D thermally conductive material of the present invention. The resultant thermally conductive plastic was measured to have a thermal conductivity of 10.9 W/m·K.

Example 3

Preparation of a Graphene-PVP Composite

Graphene (30 g, 5 wt. %) and PVP (6 g, 20 wt. %, relative to graphene were combined with a 3:1 ethanol (175 mL) and water (125 mL) mixture to obtain a 3 mg/mL graphene solution. The solution was subjected to ultrasound at a power of 1200 Wh for 10 minutes to homogeneously disperse the graphene. The mixture was then placed into a blast-drying chamber and dried at about 80° C. for about 72 hours. The 3-D graphene polymer structure was removed from the blast-drying chamber, cooled to room temperature, and then annealed in an oven at 5° C./min to 500° C. and held at that temperature for 2 hours to carbonize the polymer and produce the three-dimensional graphene structure of the present invention. The annealed structure was immersed into a solution of epoxy resin (15 g) and curing agent (4.5 g) at 100:30 mass ratio, placed under vacuum (0.1 atm) for 1 hour, and annealed at 70° C. for 4 hours to cure the epoxy resin and form the porous 3-D thermally conductive material of the present invention. The resultant thermally conductive plastic was measured to have a thermal conductivity of 16.7 W/m·K.

Example 4

Preparation of a Graphene-PVOH Composite

Graphene (5 wt. %) and PVOH (20 wt. %, relative to graphene) were homogeneously dispersed in ethanol and water (3:1) to obtain a 3 mg/ml graphene dispersion liquid that was subjected to ultrasound at a power of 1200 Wh for 10 mins. The mixture was then placed into a 80° C. blast-drying chamber and dried for 72 hours to obtain a three-dimensional graphene structure that was then annealed at 5° C./min to 500° C. and held at that temperature for 2 hours. The annealed structure was then subsequently immersed into a mixed solution of epoxy and a curing agent (100:30), placed under vacuum (0.1 atm) for 1 hour, and then cured at 70° C. for 4 hours.

Example 5

Preparation of a Graphene-Starch Composite

Graphene (40 g, 5 wt. %) and starch (8 g, 20 wt. %, relative to graphene) were combined with a 5:1 ethanol (417 mL) and water (83 mL) mixture to obtain a 4 mg/mL graphene solution. The solution was subjected to ultrasound at a power of 1200 Wh for 10 minutes to homogeneously disperse the graphene. The mixture was then placed into a blast-drying chamber and dried at about 80° C. for about 72 hours. The 3-D graphene polymer structure was removed from the blast-drying chamber, cooled to room temperature, annealed in an oven at 5° C./min to 500° C., and held at 500° C. for 2 hours to carbonize the polymer and produce the three-dimensional graphene structure of the present invention. The annealed structure was immersed into a solution of epoxy resin (15 g) and curing agent (4.5 g) at 100:30 mass ratio, placed under vacuum (0.1 atm) for 1 hour, and annealed at 70° C. for 4 hours to cure the epoxy resin and form the porous 3-D thermally conductive material of the present invention. The resultant thermally conductive plastic was measured to have a thermal conductivity of 16.7 W/m·K.

Example 6

Preparation of a Graphene-Starch Composite

Graphene (40 g, 5 wt. %) and starch (8 g, 20 wt. %, relative to graphene) were homogeneously dispersed in a 9:1 ethanol (450 mL) and water (50 mL) to obtain a 4 mg/ml graphene solution. The solution was subjected to ultrasound at a power of 1200 Wh for 10 minutes to homogeneously disperse the graphene. The mixture was then placed into a blast-drying chamber and dried at about 80° C. for about 72 hours. The 3-D graphene polymer structure was removed from the blast-drying chamber, cooled to room temperature, and then annealed in an oven at 5° C./min to 500° C. and held at that temperature for 2 hours to carbonize the polymer and produce the three-dimensional graphene structure of the present invention. The annealed structure was immersed into a solution of epoxy resin (15 g) and curing agent (4.5 g) at 100:30 mass ratio, placed under vacuum (0.1 atm) for 1 hour, and annealed at 70° C. for 4 hours to cure the epoxy resin and form the porous 3-D thermally conductive material of the present invention. The resultant thermally conductive plastic was measured to have a thermal conductivity of 7.8 W/m·K.

The invention claimed is:

1. A thermally conductive three-dimensional (3-D) graphene-polymer composite material comprising:
   (a) a porous 3-D graphene structure comprising a network of graphene layers that are attached to one another through a carbonized organic polymer bridging agent, wherein the carbonized organic polymer bridging agent is attached to the graphene layers such that the graphene layers separate to form gaps; and
   (b) a polymer material, wherein the polymer material is impregnated within the porous 3-D graphene structure, wherein the thermally conductive 3-D graphene-polymer composite material has a thermal conductivity of 1.7 W/m.K to 16.7 W/m.K at a temperature of 25° C. to 90° C.,
   wherein the carbonized organic polymer bridging agent is a non-graphene carbonized organic polymer bridging agent, and
   wherein the thermally conductive 3-D graphene-polymer composite material comprises 5 wt % to 20 wt % of the carbonized organic polymer bridging agent, based on the total weight of the porous 3-D graphene structure.

2. The thermally conductive 3-D graphene-polymer composite materials of claim 1, wherein the polymer material occupies at least 90 vol % of the pores of the porous 3-D graphene structure.

3. The thermally conductive 3-D graphene-polymer composite material of claim 1,
   wherein the carbonized organic polymer bridging agent is formed by annealing an organic carbon containing polymer at a temperature of 400° C. to 1000° C.,
   wherein the carbonized organic polymer bridging agent comprises carbon; and wherein the organic carbon containing polymer comprises at least one member selected from the group consisting of polyvinyl alcohol (PVOH), polyvinylpyrrolidone (PVP), starch, polyacrylonitrile (PAN), polydopamine (PDA), polyalkylene, polystyrene (PS), polyacrylate, polyester (PE), poly carbonate (PC), polyimide (PI), phenol formaldehyde resin, epoxy, polyalkylene glycol, polysaccharide, polyethylene (PE), polypropylene (PP), polymethylmethacrylate (PMMA), polyvinyl chloride (PVC), polyethylene terephthalate (PET), polyethylene glycol (PEG), glycogen, cellulose and chitin.

4. The thermally conductive 3-D graphene-polymer composite material of claim 1, wherein the carbonized organic polymer bridging agent is formed by annealing an organic carbon containing polymer at a temperature of 400° C. to 1000° C., and
   wherein the carbonized organic polymer bridging agent comprises carbon.

5. The thermally conductive 3-D graphene-polymer composite material of claim 1, wherein the carbonized organic polymer bridging agent is formed by carbonizing an organic carbon containing polymer selected from the group consisting of a polysaccharide, glycogen, cellulose and chitin.

6. The thermally conductive 3-D graphene-polymer composite material of claim 4, wherein the carbonized organic polymer bridging agent is formed by carbonizing polyvinyl alcohol (PVOH), polyvinylpyrrolidone (PVP), starch, polyacrylonitrile (PAN), polydopamine (PDA), polyalkylene, polystyrene (PS), polyacrylate, polyester (PE), polycarbonate (PC), polyimide (PI), phenol formaldehyde resin, epoxy, polyalkylene glycol, polyethylene (PE), polypropylene (PP), polymethylmethacrylate (PMMA), polyvinyl chloride (PVC), polyethylene terephthalate (PET), polyethylene glycol (PEG), polypropylene glycol (PPG), glycogen, cellulose, chitin, or any combination thereof.

7. The thermally conductive 3-D graphene-polymer composite material of claim 1, wherein the polymer material is a thermoset or thermoplastic material.

8. The thermally conductive 3-D graphene-polymer composite material of claim 7, wherein the thermoset material comprises an epoxy resin, an unsaturated polyester resin, a polyurethane, bakelite, duroplast, urea-formaldehyde, diallyl-phthalate polymer, an epoxy vinylester, a polyimide, an isocyanate resin, a polyisocyanate, dicyclopentadiene polymer, a phenolic, a poly(benzoxazine) polymer, a co-polymer thereof, or a blend thereof.

9. The thermally conductive 3-D graphene-polymer composite material of claim 8, wherein the thermoset is an epoxy resin, that has been cured with a curing agent.

10. The thermally conductive 3-D graphene-polymer composite material of claim 1, wherein the carbonized organic polymer bridging agent is derived from polyvinyl alcohol (PVOH), polyvinylpyrrolidone (PVP), or starch, and the porous 3-D graphene structure is impregnated with an epoxy resin.

11. The thermally conductive 3-D graphene-polymer composite material of claim 1, wherein the thermally conductive 3-D graphene-polymer composite material has a thermal conductivity of 10 W/m.K to 16.7 W/m.K at a temperature of 25 ° C. to 90° C.

12. A thermally conductive three-dimensional (3-D) graphene-polymer composite material comprising:
  (a) a porous 3-D graphene structure comprising a network of graphene layers that are attached to one another through a carbonized organic polymer bridging agent, wherein the carbonized organic polymer bridging agent is attached to the graphene layers such that the graphene layers separate to form gaps; and
  (b) a polymer material, wherein the polymer material is impregnated within the porous 3-D graphene structure,
  wherein the thermally conductive 3-D graph-polymer composite material has a thermal conductivity of 1 W/m.K to 16.7 W/m.K at a temperature of 25° C. to 90° C.;
  wherein the polymer material is a thermoset or thermoplastic material;
  wherein the thermoplastic material comprises at least one member selected from the group consisting of polyethylene terephthalate (PET), a polycarbonate (PC), polybutylene terephthalate (PBT), poly(1,4-cyclohexylidene cyclohexane-1,4-dicarbonxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI), a thermoplastic elastomer (TPE), a terephthalic acid (TPA) elastomer, poly(cyclohexanedimethylene terephthalate) (PCT), polyethylene naphthalate (PEN), a polyamide (PA), polystyrene sulfonate (PSS), polyether ether ketone (PEEK), polyether ketone (PEKK), acrylonitrile butylidene styrene (ABS), polyphenylene sulfide (PPS), a co-polymer thereof, and a blend thereof;

wherein the carbonized organic polymer bridging agent is a non-graphene carbonized organic polymer bridging agent, and wherein the thermally conductive 3-D graphene-polymer composite material comprises 5 wt % to 20 wt % of the carbonized organic polymer bridging agent, based on the total weight of the porous 3-D graphene structure.

13. A method of making the thermally conductive 3-D graphene-polymer composite material of claim 1, the method comprising:
  (a) obtaining a dispersion of graphene layers and an organic carbon containing polymer in a solvent;
  (b) drying the dispersion to obtain a porous 3-D graphene structure comprising a network of graphene layers and the organic carbon containing polymer;
  (c) annealing the porous 3-D graphene structure from (b) to carbonize the organic carbon containing polymer such that the graphene layers are attached to one another through the carbonized organic carbon containing polymer;
  (d) combining the annealed porous 3-D graphene structure from step (c) with a solution comprising a thermoset or thermoplastic material under conditions sufficient to allow the solution to infiltrate the pores of and impregnate the annealed porous 3-D graphene structure; and
  (e) curing or drying the impregnated annealed porous 3-D graphene structure to obtain the thermally conductive 3-D graphene-polymer composite material, and
  wherein the thermally conductive 3-D graphene-polymer composite material comprises 5 wt % to 20 wt % of the carbonized organic polymer bridging agent, based on the total weight of the porous 3-D graphene structure.

14. The method of claim 13, wherein the solvent in step (a) is a mixed solvent comprising water and an organic solvent that is miscible with water and has a surface tension lower than that of water.

15. The method of claim 13, wherein the concentration of the graphene layers in the dispersion in step (a) is 2 mg/mL to 20 mg/mL.

16. The method of claim 13, wherein the solution in step (d) comprises a thermoset material and a curing agent, and step (e) comprises curing the thermoset material after infiltrating the pores of the annealed porous 3-D graphene structure.

17. An article of manufacture comprising the thermally conductive 3-D graphene-polymer composite material of claim 1.

18. A thermally conductive 3-D graphene-polymer composite material comprising:
  (a) a porous 3-D graphene structure comprising a network of graphene layers that are attached to one another through a carbonized organic polymer bridging agent, wherein the carbonized organic polymer bridging agent is attached to the graphene layers such that the graphene layers separate to form gaps; and
  (b) a polymer material, wherein the polymer material is impregnated within the porous 3-D graphene structure,
  wherein the thermally conductive 3-D graphene-polymer composite material has a thermal conductivity of 1.7 W/m.K to 16.7 W/m.K at a temperature of 25° C. to 90 ° C., and wherein the carbonized organic polymer bridging agent comprises amorphous carbon, and
wherein the thermally conductive 3-D graphene-polymer composite material comprises 5 wt % to 20 wt % of the carbonized organic polymer bridging agent, based on the total weight of the porous 3-D graphene structure.

* * * * *